United States Patent [19]
Kawasaki et al.

[11] 4,059,835
[45] Nov. 22, 1977

[54] BYPASS CIRCUITS FOR IMPROVING THE RESPONSE OF ELECTRIC SHUTTERS

[75] Inventors: Masahiro Kawasaki; Hirokazu Ando, both of Tokyo, Japan

[73] Assignee: Asahi Kogaku Kogyo Kabushiki Kaisha, Japan

[21] Appl. No.: 599,006

[22] Filed: July 25, 1975

[30] Foreign Application Priority Data
July 27, 1974 Japan .................................. 49-89964

[51] Int. Cl.$^2$ ............................................. G03B 7/08
[52] U.S. Cl. ......................................... 354/24; 354/51
[58] Field of Search ................................... 354/48–51, 354/60 R, 24

[56] References Cited
U.S. PATENT DOCUMENTS
3,690,230   9/1972   Mori et al. .......................... 354/60 X

*Primary Examiner*—George H. Miller, Jr.
*Assistant Examiner*—William B. Perkey
*Attorney, Agent, or Firm*—Steinberg & Blake

[57] ABSTRACT

An electric shutter circuit employs a photodiode which forms the collector load of a logarithmic amplifier. The photodiode is shunted with an active device which is caused to conduct during shutter operation to supply an additional current to the logarithmic amplifier to permit a rapid shutter response by assuring the rapid discharge of a memory storage capacitor.

7 Claims, 3 Drawing Figures

BYPASS CIRCUITS FOR IMPROVING THE RESPONSE OF ELECTRIC SHUTTERS

BACKGROUND OF THE INVENTION

This invention relates to cameras and more particularly to improved circuitry for use with electric shutters in cameras.

Many cameras exist which employ electrically controlled shutters to automatically determine according to the brightness of a scene to be photographed the exposure time of the film.

Typically, a storage device is used in such systems where light travels through the objective to a light-receiving element, as in a single lens reflex camera, to "memorize" the subject or scene brightness and to provide an electrical signal according to the subject or scene brightness. Such systems emply a capacitor to store a charge according to the brightness. As such, these capacitors due to normal operating conditions, are relatively large and hence are associated with large charging and discharging time constants, causing a time delay which undesirably affects the response speed of the associated shutter and hence, the operating characteristics of the camera.

SUMMARY OF THE INVENTION

It is therefore an object of the present invention to provide an improved shutter control circuitry operative to rapidly charge and discharge a memory capacitor while assuring reliable and improved shutter operation.

In particular, it is an object of the present invention to provide simple inexpensive circuitry capable of being connected with a light-receiving element, which responds to brightness of the scene which is to be photographed, for the purpose of bringing about a rapid charge and discharge of a memory capacitor.

The invention includes an electric shutter circuit of the type including a two terminal light receiving element capable of generating a current corresponding to a received light quantity, said element being coupled to a logarithmic amplifier for providing a compressed signal current and said amplifier being coupled to a memory capacitor operative to charge to a value determined by said compressed current signal. For controlling the charge on the memory capacitor, an active device has an input terminal and first and second output terminals with the first output terminal coupled to one terminal of said light receiving element and said second output terminal coupled to the other terminal of said light receiving element to thereby effectively shunt the element, and means connected to the input terminal of the active device to determine the amount of current flowing between said first and second output terminals and hence, the amount of current flowing in the light receiving element and therefore the charge on said capacitor.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
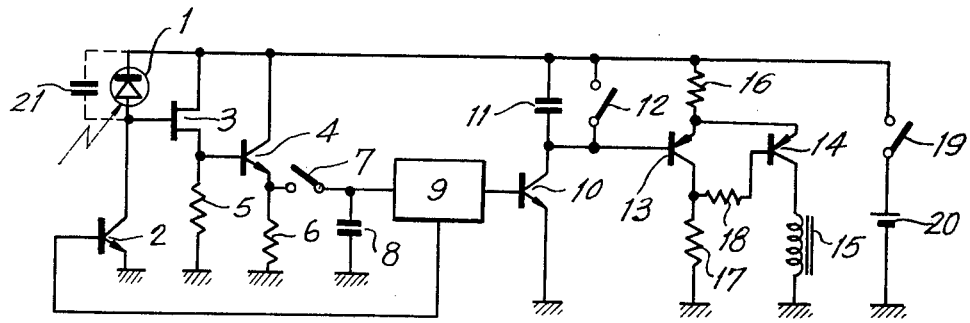
FIG. 1 is a schematic diagram of a typical prior art shutter circuit.

Referring to FIG. 1, there is shown a conventional electric shutter circuit typical of the employed in the prior art.

A light receiving element such as photodiode 1 is arranged so that light reflected from the subject impinges on the p-n junction associated with such devices. The light thus impinging on the diode 1 may first be directed through the objective lens of the camera and then reflected to the view finder of a single lens reflex camera before reaching diode 1.

The diode 1 may be a photoconductive or a photovoltaic photodiode. In the photoconductive diode a reverse bias is applied, and in the photovoltaic diode no bias is applied.

The anode of the diode 1 is typically connected to the collector electrode of a grounded emitter transistor 2, and the cathode of the diode 1 is coupled to a source of operating potential 20 via a power switch 19. The transistor 2, thus having a photodiode 1 as a collector load, operates to provide a logarithmic compressed output. It is also known to provide such logarithmic circuits both for compression and expansion of signals applied thereto.

The collector output of transistor 2 is coupled to the gate electrode of FET (field effect transistor) 3. The source electrode of the FET 3 is coupled to reference potential via a resistor 5, and the drain electrode is directly connected to the source of operating potential 20 via the switch 19. The FET 3 is thus arranged in a source follower configuration and as such possesses a high input impedance so as not to unduly load the photodiode 1 or the transistor 2.

An emitter follower transistor 4 has an emitter load resistor 6 and has its base electrode coupled to the source electrode of the FET 3. The combination of the FET source follower and the emitter follower provide a buffer amplifier having a large input impedance and a low output impedance. The low output impedance at the emitter of transistor 4 is used to charge a memory capacitor 8 via a switch 7. Thus, the emitter electrode of transistor 4 is coupled to the memory capacitor 8 via the switch 7.

The capacitor 8 is also coupled to a signal operation circuit 9 shown in block form. The circuit 9 conventionally determines an electric quantity, such as a voltage or current, according to the light emanating from the subject or scene, the sensitivity of the film used in the camera and the particular diaphragm value.

A lead from the operation circuit 9 is also coupled to the base electrode of the transistor 2 to provide a feedback loop. The feedback loop, as will be explained, controls the base current of transistor 2 according to the received light and hence, current of the photodiode 1.

An output terminal of the signal operation circuit 9 is connected to the base electrode of a transistor 10 having a grounded emitter. Transistor 10 is connected to a timing capacitor 11 as a collector load. Capacitor 11 has one terminal connected through the power switch 19 to source 20.

The transistor 10 functions to logarithmically expand the output signal. A timing switch 12 is in shunt with the capacitor 11 and is opened in a known way in synchronism with opening of the shutter.

An electromagnet 15 for terminating the exposure by releasing the trailing shutter curtain, is coupled between the collector electrode and ground of a switching transistor 14, which is controlled by a transistor 13. The base electrode of transistor 14 is coupled via a resistor 18 to the collector electrode of transistor 13. Transistor 13 is arranged in a common collector configuration having a collector load resistor 17 and an emitter load resistor 16. Resistor 16 is coupled to the switchable source of potential 20 and serves to bias both transistors 13 and 14.

The base electrode of transistor 13 is coupled to the collector electrode of transistor 10.

Also shown in dash lines at the upper left of FIG. 1 is a capacitor 21 shunting the photodiode 1. The capacitor 21 is the junction capacitor of the photodiode 1 and, for a typical device, may be of an order of magnitude of several hundred picofarads. It is understood, however, that the junction capacity may vary depending upon the diode 1 employed.

Figure 2:
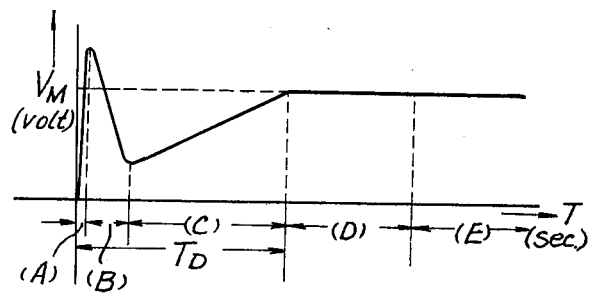
FIG. 2 is a graph depicting the charge versus time characteristics of a capacitor used in this invention.

FIG. 2 is a graph useful in explaining the operation of the circuit. The ordinate depicts the voltage variation across the memory capacitor 8, according to the abscissa, which is indicative of time T. The transitions depicted by time durations A,B,C,D & E are determined by switch operation such as the closure of the power switch 19.

TIME PERIOD A

Assume that the switch 19 is open and further assume that the diode 1 is a self-biased type biased forwardly when receiving a given amount of light. As such, as long as light is impinging on the diode 1, the junction capacitor 21 is charged. Transistor 2 is non-conducting. As soon as an operator depresses the shutter release switch, the power switch 19 and the memory switch 7 are activated and closed.

The closure of the power switch 19 causes transistors 13 and 14 to conduct and hence the electromagnet 15 is energized. Operation of the electromagnet 15 serves to retain the trailing curtain of the shutter and hence prevents shutter closure.

As indicated, the photodiode capacitor 21 is charged and the FET 3 is forward biased and hence, is conducting current via the drain to source path. The current from the FET 3 flows until the junction capacitor 21 is discharged via the gate to source path of the FET 3. The saturated current from the FET is split between the source resistor 5 and the base to emitter path of transistor 4. Through transistor 4, having a low output impedance, FET 3 serves to rapidly charge capacitor 8 (usually within a period of several milliseconds). Capacitor 8 charges to a voltage relatively equal to the voltage of the source 20 minus the source to drain saturation voltage of FET 3 minus the base to emitter voltage of transistor 4.

TIME PERIOD B

Assume that the operation unit 9 has such a rapid response that the charging time constant of capacitor 8 can be neglected and also assume that the transmission characteristic of circuit 9 between its input and output terminals is linear. Accordingly, the base voltage of transistor 2 is raised with an increase in the potential difference across the terminals of the memory capacitor 8.

As soon as the base current of transistor 2 increases the collector current increases thus discharging the junction capacitor 21. The voltage at the collector of transistor 2 falls rapidly due to the feedback loop. This, therefore, lowers the voltage on the gate of the FET 3 and the base of the transistor 4.

However, the voltage across capacitor 8 cannot follow the decrease in collector voltage of transistor 2 and hence, the emitter electrode of transistor 4 becomes more positive than the base electrode and transistor 4 ceases conduction. Since the capacitor 21 is discharging through the FET, the non-conduction of transistor 4 affects the charge stored on the memory capacitor.

Assume now that the junction capacitor 21 completed discharging before operation of the switch 19. In this condition, the diode 1 is reversed biased and develops a current which flows via the collector to emitter path of transistor 2. This collector current is usually quite small (especially for low brightness scenes) and does not reach a level high enough to follow the base electrode of transistor 2. Transistor 2 is thus saturated and biases transistor 4 off, allowing the memory capacitor 8 to discharge via resistor 6.

The discharge of capacitor 8 causes transistor 4 to turn on also aided by the feedback to the base of transistor 2. When transistor 4 comes on, the voltage across the capacitor 8 is reduced. At this point, the junction capacitor 21 is charged almost to the level of the source 20. The transistor 4 is thus cut-off until the collector voltage of transistor 2 or the gate voltage of the FET 3 is returned to a quiescent state. In any event, the memory capacitor 8 cannot discharge fully and hence, as shown in FIG. 2, returns to a predetermined level below a normal level.

TIME PERIOD C

As soon as the voltage across capacitor 8 decreases sufficiently (end of period B), transistor 4 starts to conduct to enable the recharging of the capacitor 8 to its normal level. The charge across capacitor 8 at its normal level is controlled by the transistor 2 and the diode 1, being determined by the light impinging on the diode 1.

TIME PERIOD D

The capacitor 8 thus recharges within the time $T_D$ (at the end of period C) to a level determined by the photocurrent via the diode 1 and hence, reaches a steady level during the period D, as shown in FIG. 2. In this way capacitor 8 is made ready for the next memory operation.

TIME PERIOD E

The release of the shutter in a known way opens the switch 7 and the switch 12, and the capacitor 8 has stored thereacross, the voltage as determined by the scene light. This voltage is applied through circuit 9 to the base electrode of transistor 10. Transistor 10 and the collector capacitor 11 then determine the time constant necessary for releasing the trailing curtain to close the shutter. Capacitor 11 is thus charged according to the base voltage on transistor 10 and hence, its collector voltage is decreased until transistor 13 is biased off, thus turning off transistor 14 and hence, releasing the electromagnet 15 to thereby finalize the shutter closure.

In the above circuit, due to the charging rate of capacitor 8, the transistor 4 will become non-conductive and hence, prevent the full discharge of the capacitor 8, thus creating undue circuit delay and unreliable operation.

With the above noted problems in mind, it is seen that the non-conduction of transistor 4 causes the undue delay in the charging and discharging of the memory capacitor 8.

Figure 3:
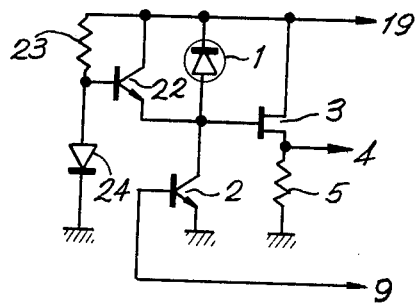
FIG. 3 is a schematic diagram of a bypass circuit according to this invention.

Referring to FIG. 3, there is shown the logarithmic compression amplifier 2 having the photodiode 1 as a collector load and having the collector coupled to the gate electrode of the FET 3 as also shown in FIG. 1. The connections to the FET 3 and the base electrode of transistor 2 are identical with those of FIG. 1.

According to the invention, a transistor 22 has its collector electrode coupled to the switched power source 20 and the cathode of the photodiode 1. The emitter electrode of transistor 22 is coupled to the anode of the diode 1. Thus, the collector to emitter path of transistor 22 is in shunt with the photodiode 1. The base electrode of transistor 22 is biased by a resistor 23 coupled between the power source and the base. Also coupled to the base of transistor 22 is a diode 24 having its anode coupled to the base and its cathode returned to a point of reference potential. The diode, as coupled to the base electrode, is forward biased and hence, the drop across the anode to cathode junction is between 0.5 to 0.7 volts depending upon the type of diode 24 used.

The circuit operates to eliminate the non-conducting state of transistor 4 in the following manner:

As indicated (Time Period B), the collector current of the logarithmic amplifier 2 is dependent upon the electric charge stored in the junction capacitor 21 of the photodiode 1 and hence, the collector voltage of the transistor 2 remains at a low level.

The voltage drop of the logarithmic compression transistor 2 and hence the voltage drop at the gate terminal of the FET 3 can be prevented by provision of a current supply source which is formed by connecting a transistor 22 in parallel to the junction capacitor 21.

In this circuit, the photodiode capacitor 21 discharges via the shunt transistor 22. Since the emitter voltage in transistor 22 is determined by the bias on the base, the memory capacitor 8 voltage cannot drop to a low level. The transistor 22 operates to provide the additional current to the collector of the transistor 2 during the period A to prevent cut-off of the transistor 4.

As soon as the collector voltage of transistor 2 rises to a suitable level, transistor 22 becomes biased off and thereafter the transistor 2 responds only to the current flowing through the photodiode 1, thus causing it to logarithmically compress the same to assure that the memory capacitor 8 is properly charged.

While a transistor 22 is shown, it is understood that a FET or other active device will operate accordingly.

What is claimed is:

1. In an electric shutter circuit, a two terminal light receiving element capable of generating a current corresponding to a received light quantity, said element being a photodiode having anode and cathode terminals and including a junction capacitor, a logarithmic amplifier coupled to said element for providing a compressed current signal and means coupling to said amplifier a memory capacitor operative to charge to a value determined by said compressed current signal, and, for controlling the charge on said memory capacitor, an active device having an input terminal and first and second output terminals, with said first output terminal coupled to one terminal of said light receiving element and said second output terminal coupled to said other terminal of said light receiving element, to thereby effectively shunt said element, a signal operation circuit coupled to said memory capacitor and a lead from said signal operation circuit coupled to said logarithmic amplifier to provide a feedback loop, and means separate from and unconnected to said logarithmic amplifier while being connected to said input terminal of said active device to determine the amount of current flowing between said first and second output terminals and hence, the amount of current flowing in said light receiving element and, therefore, the charge of said capacitor, said means coupling said memory capacitor to said amplifier including a source-follower FET coupled to said logarithmic amplifier and an emitter-follower transistor coupled between said source-follower FET and said memory capacitor, said active device, when the electric shutter circuit is set into operation, providing for discharge of said junction capacitor and providing additional current for said logarithmic amplifier for preventing cut-off of said emitter-follower transistor and dropping of the voltage of said memory capacitor to an undesirably low level.

2. The circuit according to claim 1 wherein said active device is a transistor having a base input terminal, a first collector output terminal and a second emitter output terminal.

3. The circuit according to claim 2 wherein said means coupled to said base input terminal consists of a resistor having a first terminal adapted to be connected to a point of operating potential and a second terminal coupled to said base electrode, and a diode having anode and cathode electrodes, with one of said electrodes coupled to said base electrode and said other electrode coupled to a point of reference potential.

4. In an electric shutter circuit, a two terminal light receiving element capable of generating a current corresponding to a received light quantity, said element being a photodiode having anode and cathode electrodes and a junction capacitor, a logarithmic amplifier coupled to said element for providing a compressed signal current and means coupling to said amplifier a memory capacitor operative to charge to a value determined by said compressed current signal, and for controlling the charge on said memory capacitor, a transistor having a base input electrode and a collector to emitter path coupled across said light receiving element to effectively shunt the same, and biasing means separate from and unconnected to said logarithmic amplifier while being coupled to said base electrode to control the current flowing through said collector to emitter path and, therefore, the current through said element to determine the charging rate of said memory capacitor, a signal operation circuit coupled to said memory capacitor, and a lead from said operation circuit coupled to said logarithmic amplifier to provide a feedback loop, said means coupling said memory capacitor to said amplifier including a source-follower FET coupled to said logarithmic amplifier between the latter and said light receiving element and an emitter follower transistor coupled between said source-follower FET and said memory capacitor, said transistor shunting said light receiving element, when the electric shutter circuit is set into operation, providing for discharge of said junction capacitor and providing additional current for said logarithmic amplifier for preventing cut-off of said emitter-follower transistor and dropping of the voltage of said memory capacitor to an undesirably low level.

5. In an electric shutter circuit for use in a camera, a light receiving element operative to provide an output current corresponding to a light quantity received by the camera from a subject, said light receiving element comprising a photodiode having a junction capacitor, a logarithmic amplifier having an output terminal and an input terminal, and having said element coupled in series with said output terminal to provide a load for said amplifier, a storage capacitor having a first and a second terminal, a signal operation circuit coupled to said storage capacitor, a lead from said operation circuit coupled to said logarithmic amplifier to provide a feedback loop, means coupling said first terminal of said storage capacitor to said output terminal of said amplifier for receiving a charge proportional to said output current, an active device having an output current path and an input control terminal, said output path being coupled in shunt with said light receiving element, and means separate from and unconnected to said logarithmic amplifier while being coupled to said input control terminal of said active device for controlling said output current to thereby affect the time during which said capacitor can be charged, said means coupling said first terminal of said storage capacitor to said output terminal of said amplifier including a source follower FET also coupled to said output terminal of said logarithmic amplifier and an emitter-follower transistor coupled between said source-follower FET and said storage capacitor, said active device, when the electric shutter circuit is set into operation, providing for discharge of said junction capacitor and supplying additional current to said logarithmic amplifier for preventing cut-off of said emitter-follower transistor and dropping of the voltage of said storage capacitor to an undesirably low level.

6. The circuit according to claim 7 wherein said active device is a transistor having a collector to emitter output path and a base input control terminal.

7. The circuit according to claim 6 wherein said means coupled to said input control base terminal of said transistor consists of a resistor-diode series string with a junction between said resistor and diode coupled to said base terminal.

* * * * *